United States Patent

[11] 3,628,178

[72] Inventor Edmond B. Treacy
 Vernon, Conn.
[21] Appl. No. 752,692
[22] Filed Aug. 14, 1968
[45] Patented Dec. 14, 1971
[73] Assignee United Aircraft Corporation
 East Hartford, Conn.

[54] DIFFRACTIVE COUPLING LASER MIRROR
 1 Claim, 8 Drawing Figs.
[52] U.S. Cl. ................................................. 331/94.5
[51] Int. Cl. ................................................. H01s 3/08,
 H01s 3/22
[50] Field of Search ..................................... 331/94.5

[56] References Cited
 UNITED STATES PATENTS
 3,247,467 4/1966 Geusic et al. .................. 331/94.5

OTHER REFERENCES

La Touretto et al., " Improved Laser Angular Brightness Through Diffraction Coupling," Appl. Optics 3, (8), Aug. 1964, pp. 981– 2

Fialkowskii, " Coupled Oscillations....with Flat Reflectors," Soviet Physics– Tech. Physics, 11, (6), Dec. 1966, pp. 813– 17

Zaitsev, " Balljoint for the Adjustment of....A Gas Laser," (Soviet) Technical Experimental Physics 03, May– June 1966, pp. 736– 7

Primary Examiner—Ronald L. Wibert
Assistant Examiner—R. J. Webster
Attorney—Melvin Pearson Williams ABSTRACT: A diffracting coupling mirror is designed to operate with an area less than the dimension of a dominant mode of a laser, thus providing an apodized beam of high resolution and eliminating the need for conventional output coupling; a cooled embodiment as well as circular, cylindrical and annular embodiments are disclosed.

Patented Dec. 14, 1971

INVENTOR
E.B. TREACY

BY Melvin Pearson Williams

ATTORNEY

Patented Dec. 14, 1971

DIFFRACTIVE COUPLING LASER MIRROR

BACKGROUND OF THE INVENTION

1. Field of Art

This invention relates to lasers, and more particularly to a diffractive coupling mirror therefore.

2. Description of the Prior Art

Many forms of lasers are known to the prior art, nearly all of which include an optical cavity having mirrors accurately positioned on opposite sides of a lasing medium, the mirrors resonating the electromagnetic radiation so as to achieve a high-intensity, coherent beam of energy in the visual or near visual spectrums. In order to obtain power out of the laser, it is necessary that some of the energy within the laser be coupled out. One form of coupling is a partially reflecting mirror, which reflects some of the light so as to stimulate oscillations, while passing some of the light for useful laser output. Another form of coupling is a small hole in the center of one of the mirrors, a small amount of the radiation passing through the hole out of the laser. However, with increasing power density, the partially reflecting mirror absorbs so much energy that it is likely to melt. Hole coupling is disadvantageous since the hole appears at a point in the mirror where reflected energy of the dominant mode is desired in order to sustain maximum oscillations of the dominant mode. Additionally, the holes cause diffraction of the output beam and may give secondary effects depending upon the size and positioning of the hole. Other complex forms of laser mirrors and output coupling means have been known but for one reason or another are less than optimum in their application in modern laser devices.

SUMMARY OF THE INVENTION

The object of the present invention is to provide improved power output coupling in a laser.

According to the present invention, one mirror of the optical cavity of a laser is made smaller than the effective cross-sectional area of the electromagnetic radiation generated within the laser so as to provide a combination mirror coupler in the form of a diffracting obstacle.

The present invention provides the advantage of apodization (a narrower diffraction pattern than that of a full beam) as well as automatic selection of the dominant mode. The diffractive coupling mirror in accordance herewith may be cooled by a liquid communicated thereto through hollow supporting fins. This provides utility where very high-power densities of the primary mode are required. Conventional coupling is obviated by this invention.

As used herein the term laser shall mean both optical and microwave amplification of stimulated electromagnetic radiation.

Other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
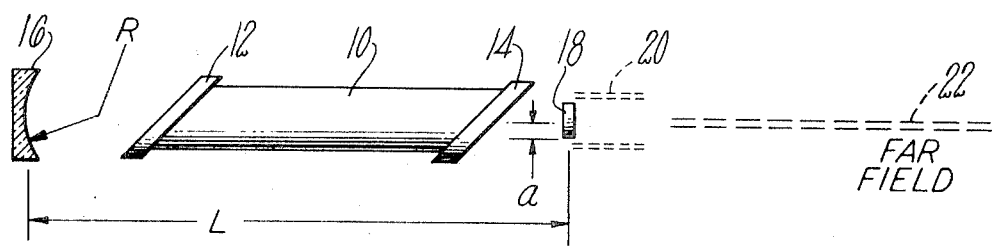
FIG. 1 is a schematic diagram of a laser in accordance with the present invention, illustrating various parameters thereof.

Referring now to FIG. 1, a schematic illustration of the present invention includes a laser chamber 10 which is sealed at opposite ends thereof by Brewster windows 12, 14 and which is located within an optical cavity including a concave mirror 16 and a diffractive coupling mirror 18. The diffractive coupling mirror 18 has a diameter (twice the radius "$a$") which is less than the effective optical diameter of the laser itself, which is governed by the radius of curvature ($R$) of the concave mirror 16 and the length ($L$) between the two mirrors. As illustrated by the dashed lines 20, some of the light generated in the cavity spills over around the edges of the mirror 18, and causes an apodized beam. Provided the distance L is not more than one-half of the radius of curvature R of the mirror 16, the substantial radius of the dominant laser mode ($w$) (see FIG. 2.) is determined by the following relationship:

$$w = \left(\frac{\lambda L}{\pi}\right)^{1/2} \left(\frac{R-L}{L}\right)^{1/4}$$

Figure 2:
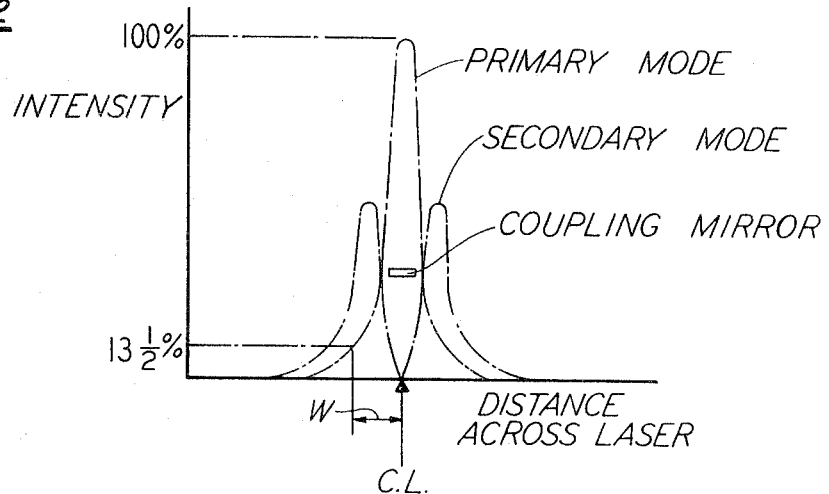
FIG. 2 is a graphic illustration of the principle of operation of the present invention relative to dominant and other modes.

As seen in FIG. 2 $w$ is the radius of that portion of the beam which has an intensity in excess of 13 percent of the maximum intensity of the dominant mode. Thus, as used herein, the "beam" can be considered as that portion of the light within the laser which has an intensity greater than 13 percent of its maximum.

Further, assuming that the field diffracted into the plane of the coupling mirror 18 by the spherical mirror 16 is of constant phase and has the usually Gaussian amplitude distribution (see FIG. 2) across the surface of the flat mirror from the center outwardly, then the power coupling factor $N$ is given by the following relationship: $N \approx e^{-2a^2/w^2}$ In the case where $a$ equals $w$, the coupling factor $N$ is about 0.135.

The power coupled in accordance with this invention all appears, in the far field, in a highly parallel radiation pattern, or beam indicated in FIG. 1 by the dashed lines 22, and it provided a degree of resolution similar to what has been achieved by astronomers utilizing similar apodization techniques in large telescopes of good resolution.

Referring to FIG. 2, an important feature of the invention, which is automatic selection of the primary mode of the laser by the coupler, is readily achieved by providing a coupling mirror 18 with a size which bears a proper relation to the amplitude distribution of the primary mode. As can be seen in FIG. 2, if the coupling mirror is of a diameter shown therein, it will cause maximum oscillation of the laser in response to the maximum, central portion of the primary mode, and will center the mode on the mirror. Oscillation of the secondary modes will be highly attenuated because of the fact that the amplitude of the secondary mode at the central point (that is, near the axis) of the optical cavity is extremely small so that amplification will not be sustained. Additionally, the amplitude distribution of the primary mode permits coupling only a portion of the power out of the laser, while at the same time providing maximum amplification in response to the maximum amplitude of the primary mode.

Thus, the invention achieves both automatic selection and centering of the dominant mode of the laser by a very simple means, and nearly perfect, high-resolution coupling of a portion of the laser power.

By reference to the relationships given in the formulas above, it can be seen that the power coupling factor is easily and continuously adjustable merely by adjusting the length ($L$) between the two mirrors 16, 18.

It will be understood by those skilled in the art, that achieving automatic selection of the dominant mode and providing a simple means for adjusting the coupling factor are significant advances in the art.

Figure 3:
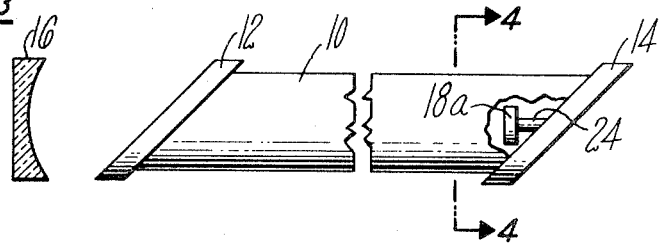
FIG. 3 is a schematized, partially broken away, simplified side elevation of a first embodiment of the present invention.
Figure 4:
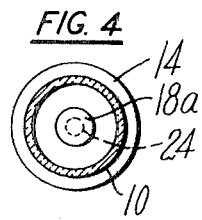
FIG. 4 is a front elevation taken on the line 4—4 of FIG. 3.

A preferred embodiment of the invention is illustrated in FIGS. 3 and 4. Therein, the mirror 18a is supported directly on the Brewster window 14 by means of a stud 24 which is integrally formed with, or attached to the mirror 18a, and which in turn may be fastened directly to the Brewster window 14 by means of a suitable adhesive, such as epoxy glue. Alternatively, the mirror 18a may be fastened to the Brewster window 14 by any other suitable means, of which a plethora are available in the art. It should be noted that this embodiment has the great advantage of providing a nearly ideal diffraction obstacle which tends to form a beam of very high resolution. The appearance of an Arago spot just behind the mirror, outside the laser, is a simple method of verifying the near perfect geometry when a system is being adjusted.

Figure 5:
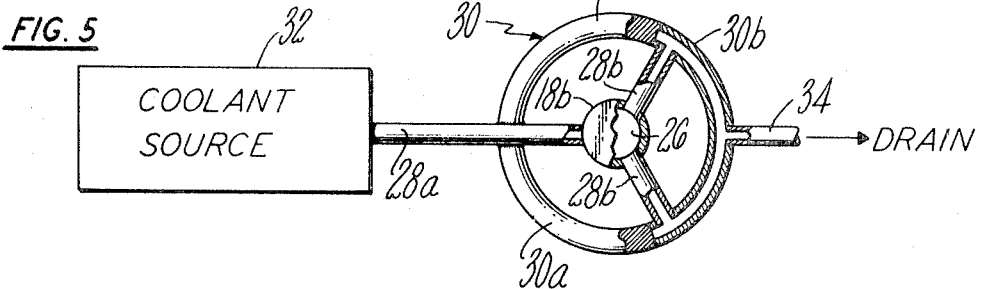
FIG. 5 is a simplified front elevation of an alternative embodiment of the present invention including fluid cooling.

Another embodiment of the present invention is illustrated in FIG. 5. Therein, the mirror 18b may comprise a flat surface of a polished reflective material such as copper or gold mounted on a suitable chamber 26 of substantially the same size as the mirror 18b. The mirror and chamber 26 are supported by hollow fins 28 suspended within a partly hollow ring 30, the fins 28 being in fluid communication with portions of the ring 30. A coolant may be introduced from a source 32, into the fin 28a and the coolant may be caused to flow outwardly through the fins 28b and a hollow portion 30b of the ring 30 into a drain tube 34. The portions 30a of the ring 30 may be solid, or otherwise blocked so as to force the flow through the fins 28a. This embodiment has the advantage that extremely high-power densities may be sustained by the mirror without causing damage thereto provided a suitable coolant is maintained flowing through the system. However, this embodiment does have the disadvantage that the fins 28 provide interference patterns so that the laser output beam does not have nearly as good resolution as that of the embodiment of FIGS. 3 and 4.

Figure 6:
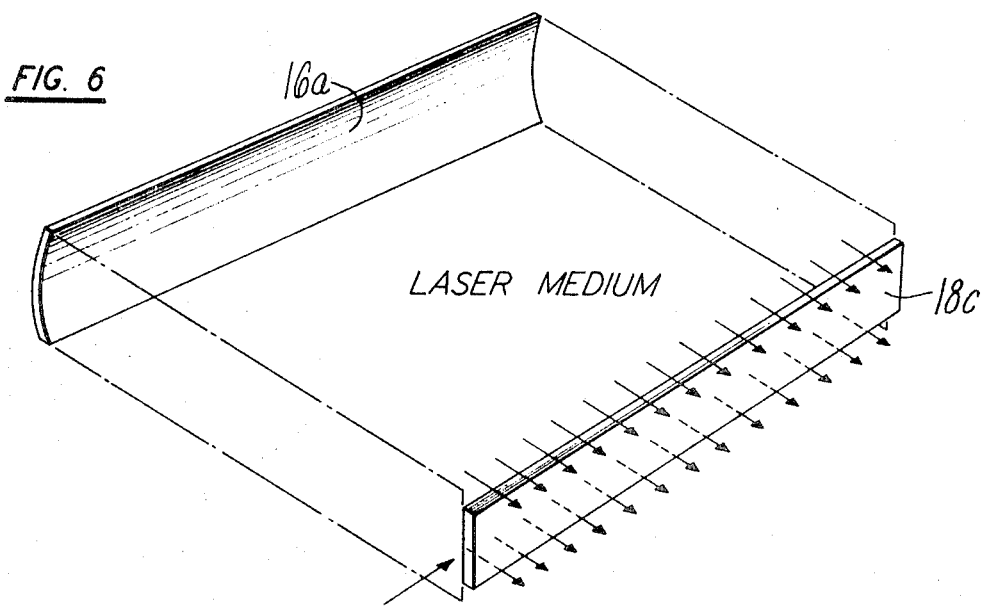
FIG. 6 is a perspective view of a cylindrical-rectangle version of the present invention.

Another embodiment of the present invention would appear essentially as shown in FIG. 3 from the side view, but rather than being of circular symmetry (as illustrated in FIG. 4) the embodiment is cylindrical in nature. This is shown in FIG. 6 wherein the concave mirror 16a is a portion of a cylinder having a radius of curvature which is greater than the distance between the two mirrors, and the coupling mirror 18c is rectangular in shape. This results in a well-defined, broad beam, the operation of which can be verified by viewing an elongated Arago spot, in the manner similar to that described hereinbefore with respect to the embodiments of FIGs. 1, 3, 4, and 5.

Figure 7:
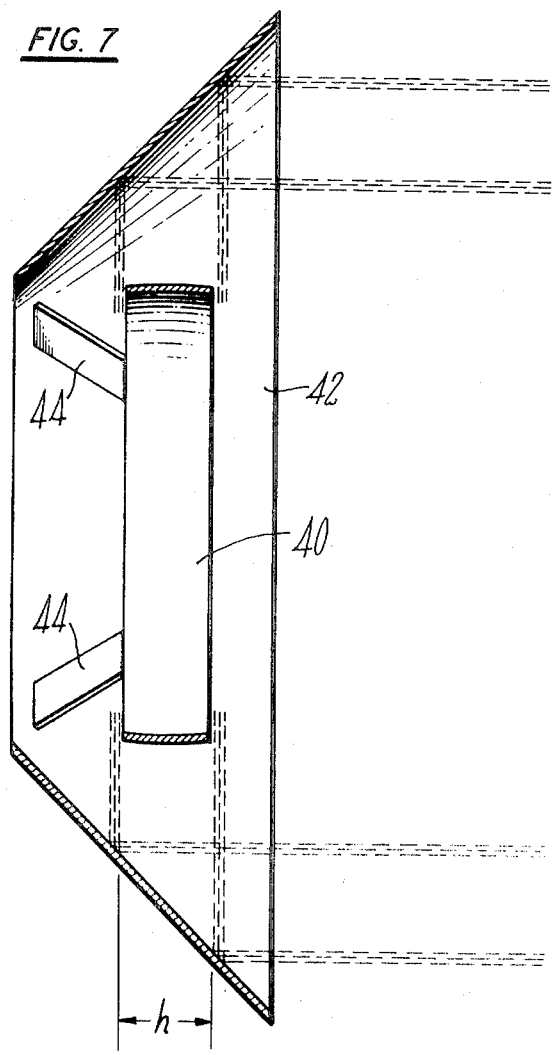
FIG. 7 is a sectioned, side elevation view of an annular version of the invention.
Figure 8:
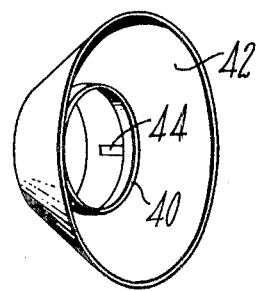
FIG. 8 is a perspective view of the embodiment of FIG. 7.

Another embodiment of the present invention is illustrated in FIGS. 7 and 8. Therein, a single concave annular mirror 40 permits oscillations in a radial fashion within the area it circumscribes, the height of the mirror "$h$" (equivalent to "$a$" in FIG. 1) being chosen in comparison with the radius of curvature and diameter so as to allow diffractive spillover. The spillover light is reflected by a truncated substantially conical mirror 42 so as to provide two rings of intense illuminations close to the mirror 42, which in turn results in a well-defined hollow cylindrical beam of light (similar to that of FIG. 1) at some distance from the mirror 42. The mirror 40 may be supported by fins 44. The lasing medium is omitted in FIGS. 7 and 8 for clarity.

Although the invention has been shown and described with respect to preferred embodiments thereof, it should be understood by those skilled in the art that various changes and omissions in the form and detail thereof, may be made herein without departing from the spirit and scope of the invention.

Having thus described typical embodiments of my invention, that which I claim as new and desire to secure by Letters Patent of the Unites States is:

1. A laser comprising:
   an annular concave mirror surrounding a lasing medium, said mirror having a radius of curvature of concavity which is greater than its annular diameter, said mirror having a dimension transverse to the major circular plane thereof which is less than the dimensions of the dominant mode of radiation at the point of interference with said mirror, said mirror thereby comprising a diffractive coupling mirror exhibiting the property of allowing diffractive spillover around the edges thereof;
   and a truncated, substantially conical mirror having its major circular plane parallel with the major circular plane of said concave mirror, said conical mirror reflecting two radial planes of spillover radiation so as to provide two cylinders of spillover radiation, thereby to provide a beam of high resolution in the far field of said laser.

* * * * *